May 22, 1923.
F. W. STOCKTON
HERMETIC SEAL
Filed Nov. 3, 1921
1,455,894
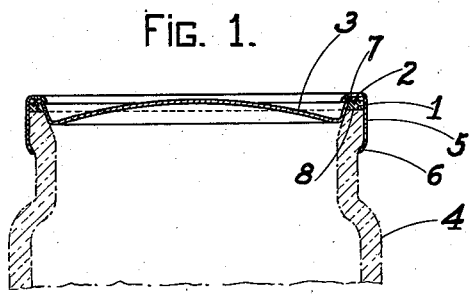
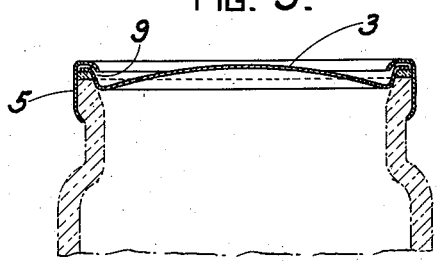
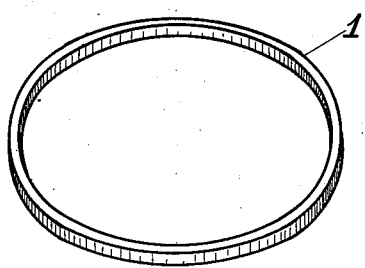
WITNESSES
INVENTOR
Frank Webb Stockton
By Winter & Brown
ATTORNEYS Patented May 22, 1923.

1,455,894

UNITED STATES PATENT OFFICE.

FRANK WEBB STOCKTON, OF PITTSBURGH, PENNSYLVANIA, ASSIGNOR TO ALUMINUM SEAL COMPANY, OF NEW KENSINGTON, PENNSYLVANIA, A CORPORATION OF PENNSYLVANIA.

HERMETIC SEAL.

Application filed November 3, 1921. Serial No. 512,590.

*To all whom it may concern:*

Be it known that I, FRANK W. STOCKTON, a citizen of the United States, and a resident of Pittsburgh, in the county of Allegheny and State of Pennsylvania, have invented a new and useful Improvement in Hermetic Seals, of which the following is a specification.

This invention relates to hermetic seals and particularly to that type adapted to be used for the hermetic closures of jars or bottles, especially in connection with suitable metallic or other parts.

The object of my invention is to provide an unvulcanized rubber seal capable of being formed by extrusion and cutting off in the usual way (although I do not limit myself to this method of forming the rings), and which will combine the desirable stiffness, resilience, strength, and resistance to oils of vulcanized rubber seals with the plasticity, adhesiveness and cheapness of unvulcanized seals, also, one which has excellent keeping qualities as compared with the unvulcanized seals of the prior art.

It is customary in making bottle closures to use a resilient medium such as rubber, either vulcanized or unvulcanized, cork, paper or similar materials which are compressed in the joint between an impermeable and more or less rigid cover, such as a piece of glass or metal, and the top of the jar or bottle to be closed. This pressure is usually maintained by a suitable metallic portion of the closure which engages both the above mentioned rigid cover and the jar or bottle to be sealed. There are a great many means of accomplishing this attachment of the cover to the bottle or jar and I do not limit myself to any particular one.

The rubber rings or seals used in bottle closures at present are of two classes,—vulcanized and unvulcanized. The vulcanized rings are very much stiffer and more resilient than the unvulcanized rings heretofore used, but they are likewise more expensive on account of the additional cost of vulcanization, and the process of vulcanization has given them a permanent shape so that their flow under pressure in the bottle closure is strictly limited, and great care must be taken in the assembly of the closure that these rings are not twisted but are made to lie perfectly flat, since if twisted they do not conform sufficiently under compression to make a tight joint. The unvulcanized seals, on the other hand, are soft and have a decided plasticity so that no matter how much they are twisted, compression in the closure causes them to flow and take up the shape of the sealing surface. Unvulcanized seals have another property which is very advantageous and in fact essential for certain types of closures, namely, their property of becoming sticky when heated, thus assisting in the assembly of the parts.

In the accompanying drawings Fig. 1 illustrates in section a closure in which my improved sealing ring is used; Fig. 2 is a perspective view of the sealing ring before assembly of the several parts forming the closure; and Fig. 3 is a view similar to Fig. 1 illustrating the separation of the cover and capsule frequently occurring in closures of this type, in which unvulcanized seals are employed.

In the embodiment shown, 1 designates the sealing ring which is positioned in the peripheral channel 2 of the cover 3 spanning the top of the jar 4 to which the closure is attached by the capsule 5. The capsule is fixed to the jar by crimping in a well known manner as indicated at 6 and is provided with the concaved rim 7 cooperating with the channel 2 of the cover 3 to bind the same, together with the ring 1, into intimate contact with the top 8 of the jar.

The cover 3, capsule 5, and ring 1 forming the closure are assembled upon a heated chuck which by pressing the ring into place causes it to adhere to the capsule and cover so that the latter forms a hermetic sealing closure which can be conveniently handled and shipped in assembled condition ready for application to bottles or jars.

The unvulcanized seals of the prior art, while very satisfactory from the standpoint of their adhesion to the metal surfaces above mentioned have been deficient in stiffness and elasticity or resilience both in the hot and cold condition. In particular, when heated to the temperature of boiling water, as they often must be on goods which are to be sterlized after sealing, they become so soft as to offer practically no resistance to pressure and thus permit the vacuum, which is produced when a bottle is sealed and allowed to cool, to draw the top plate away from the enclosing capsule into such a position as to leave a space 9 between the two, as clearly illustrated in Fig. 3, so that the top plate or cover is only held on the bottle by the vacuum and may be easily dislodged and the seal therefore caused to leak by rough handling or shocks incident to shipping of the goods. One disadvantage of the unvulcanized seals of the prior art is that they are very frequently attacked and disintegrated by oils such for example, as peanut oil or salad oils, presumably on account of the attack of rubber by these oils. For this reason it has been necessary to use the more expensive vulcanized rubber rings when such products as peanut butter or other oily materials were being put up with a sealing device of this type. Another disadvantage of many of the unvulcanized seals is that they deteriorate rather rapidly during storage prior to use with resulting loss and expense to the user.

The unvulcanized seals of the prior art usually consist of some variety of gum rubber which has been compounded with various inert fillers such as china clay, barytes, asbestos, talc, infusorial earth and similar materials which give to the rubber a much larger volume but have no action upon it other than the physical one of diluting it. Such admixture of inert fillers may compose from 30% to 70% approximately of the weight thereof, the remainder being rubber, rubber-like materials or organic matter. These seals are maufactured by compounding the several ingredients in a rubber mill or a similar machine and are then generally extruded hot in the form of a tube and cut transversely to make suitable rings.

I have discovered that if in an unvulcanized rubber seal, a substantial part or all of the inert filler above mentioned be replaced by certain forms of very finely divided active solids such for example, as carbon or gas black, there results a product having properties essentially different from the unvulcanized rubber ones heretofore used. It is well known in the art that the natural resilience of gum rubber is largely destroyed during the process of breaking it down or milling it on rolls and compounding inpredients thereinto. The introduction of the inert mineral ingredients above mentioned in the unvulcanized rubber products leaves the rubber in a broken down condition with substantially no resilience. I have found that if, instead of a substantial part or all of the above mentioned inert mineral fillers, a finely divided active form of solid, such as carbon or gas black, is used, there takes place some sort of union of this material with the rubber which gives it many of the properties of vulcanized rubber; particularly, the properties of resilience and stiffness to an extent dependent on the proportion of this active filler and rubber. By the use of a sufficient amount of this active ingredient, the resilience, stiffness and other desirable properties of this unvulcanized product may be made comparable to that of a vulcanized one without losing the desired plasticity and adhesiveness of the former. Moreover, tests show that the introduction of a substantial amount of this active ingredient so changes the property of the unvulcanized rubber product that whereas the best products of the prior art are completely disintegrated by a few hours of immersion in peanut oil, my improved one successfully resists the action of the oil and retains its form and much of its firmness and resilience after months of immersion therein. The profound change in properties of the rubber appears to be due to some sort of interaction between the active solid particles and the rubber. While I do not limit myself to any particular explanation of this phenomenon, I am inclined to think that it is due to an actual adhesion of the rubber to the surfaces of these particles which adhesion may be in the nature of an adsorption, whereas it is probable that the rubber does not actually adhere to the surfaces of the particles of the inert filler but merely surrounds these particles.

As an example of my improved sealing compound, I may compound together in the usual way the following materials:

| | Pounds. |
|---|---|
| Rubber | 50 |
| Gas black | 30 |
| Inert filler (such as clay, talc, barytes, infusorial earth, cork, etc.) | 18 |
| Softening agent | 2 |

The softening agent may be paraffin, palm oil, fully hydrogenated cotton-seed oil, mineral rubber or other similar material adapted to facilitate the extrusion of the compound. After the material has been properly compounded, for example, in a rubber mill of the customary type, it is transferred to an extrusion machine such as is common in the art, where it is extruded at an elevated temperature in the form of a tube. This tube is then put through a suitable machine which flattens it and cuts it transversely into rings.

These rings 1 may then be assembled upon a heated chuck according to the present practice with the necessary metallic parts 3 and 5 to form a seal such as is shown in the drawings and previously described. The adhesiveness of the sealing ring 1 is sufficient to firmly hold the metal parts 3 and 5 in position when thus assembled. When the resulting closure is used to seal a bottle or jar, either hot or cold, in the customary manner, and by the use of the customary machines for applying the same, the superior resilience of my improved sealing ring allows the subsequent sterilization, handling and shipping of the container without the development of leaks which would be likely to occur if a less resilient material were used, owing to vibration, impact of other bodies or changes of temperature.

The rubber used may be of any suitable grade, or it may be partially admixed with balata, gutta percha, or similar substances. Other organic substances, such as glue, casein, rubber substitutes, factice, reclaimed rubber or similar materials may be incorporated by means known to the prior art. The amount of added finely divided solid matter may vary from about 15% to about 75% by weight of the total compound. This finely divided solid material may consist wholly or in part of gas black, there being preferably present a sufficient quantity of such active material to form at least about 15% of the unvulcanized product. The resilience and other desirable properties of the resulting product depends upon the proportion of this active material to the rubber. If a very large amount of active material is used, the resulting compound may be so stiff as to be unsuitable for extrusion, in which case it may be formed into sheets in a calender, which sheets may be made into tubes and cut off, or may be used to punch out disks or rings if desired. The proportion of rubber and other plastic materials may vary between 25% and 85% of the whole, depending upon the properties desired. The inclusion of factice as one of the ingredients produces a product maintaining greater stiffness at high temperatures, that is, one which remains comparatively firm at such temperatures, and it is used in proportions suitable to effect the desired result.

I claim:

1. A hermetic seal made of an unvulcanized rubber compound containing finely divided active carbon dispersed therein to maintain stiffness and resilience even at elevated temperatures.

2. A hermetic seal made of an unvulcanized rubber compound containing not less than about 15% of finely divided active carbon dispersed therein to maintain stiffness and resilience even at elevated temperatures.

3. A hermetic closure comprising a seal made of an unvulcanized rubber compound containing finely divided active carbon dispersed therein to maintain stiffness and resilience even at elevated temperatures, and a cover fastening said seal to the vessel to be sealed.

4. A hermetic seal made of an unvulcanized rubber compound containing not less than about 15% of finely divided active gas black dispersed therein to maintain stiffness and resilience even at elevated temperatures.

5. A hermetic closure comprising a cover, a seal made of an unvulcanized rubber compound containing finely divided carbon dispersed therein to maintain stiffness and resilience even at elevated temperatures, and means for fastening said cover and seal to the vessel to be sealed, the said seal also adhering to the cover and fastening means to retain the same in fixed assembled relation.

6. A hermetic closure comprising a cover, a seal made of an unvulcanized rubber compound containing not less than about 15% of finely divided active carbon dispersed therein to maintain stiffness and resilience even at elevated temperatures, and fastening means for attaching the cover and seal to the vessel to be sealed.

7. A hermetic closure comprising a cover, a seal made of an unvulcanized rubber compound containing not less than about 15% of finely divided active gas black dispersed therein to maintain stiffness and resilience even at elevated temperatures, and fastening means for the said cover and seal.

8. A hermetic closure comprising a cover, a sealing ring of unvulcanized rubber, containing not less than about 15% of finely divided active carbon dispersed therein to maintain stiffness and resilience even at elevated temperatures, abutting the inner periphery of said cover, and a fastening capsule, a portion of which engages the outer periphery of the cover for binding the seal into intimate contact with the sealing surface of the vessel to be sealed.

9. A hermetic closure comprising a cover, a sealing ring of unvulcanized rubber, containing not less than about 15% of finely divided active gas black dispersed therein to maintain stiffness and resilience even at elevated temperatures, disposed adjacent the periphery of the cover, a capsule engaging both the cover and ring for attaching the same to the vessel to be sealed, said ring adhering to both said cover and capsule to hold the parts in assembled relation.

10. A hermetic seal made of an unvulcanized rubber compound containing a finely divided active solid dispersed therein to maintain stiffness and resilience even at elevated temperatures.

11. A hermetic closure comprising a seal made of an unvulcanized rubber compound containing a finely divided active solid dispersed therein to maintain stiffness and resilience even at elevated temperatures, and a cover fastening said seal to the vessel to be sealed.

12. A hermetic closure comprising a cover, a seal made of an unvulcanized rubber compound containing a finely divided active solid dispersed therein to maintain stiffness and resilience even at elevated temperatures, and means for fastening the cover and seal to the vessel to be sealed, the said seal also adhering to the cover and fastening means to retain the same in fixed assembled relation.

In testimony whereof, I sign my name.

FRANK WEBB STOCKTON.